June 28, 1927.
C. FROESCH
1,633,580
BEARING
Filed June 14, 1924
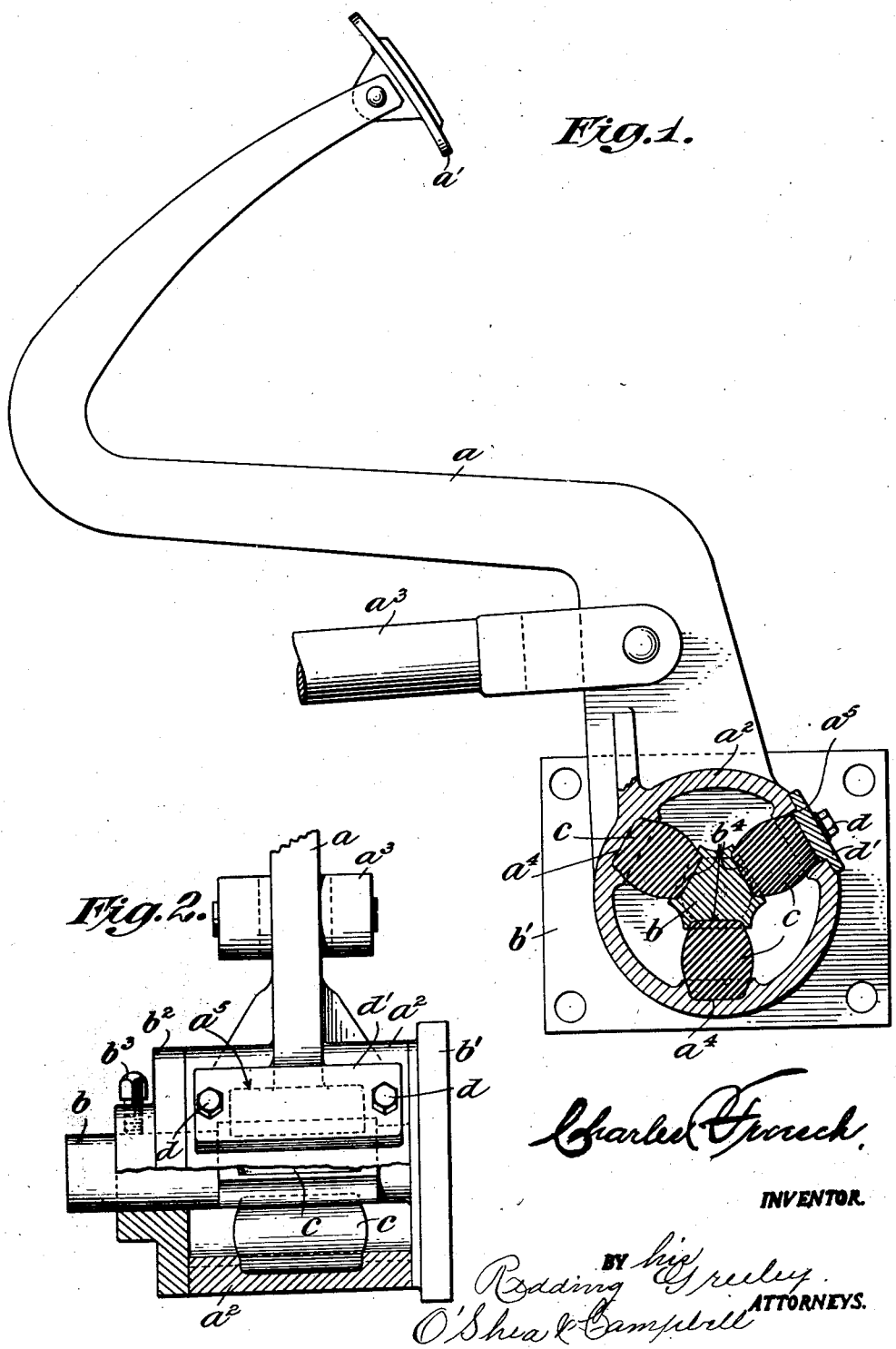

Patented June 28, 1927.

1,633,580

UNITED STATES PATENT OFFICE.

CHARLES FROESCH, OF NEW YORK, N. Y., ASSIGNOR TO INTERNATIONAL MOTOR COMPANY, OF NEW YORK, N. Y., A CORPORATION OF DELAWARE.

BEARING.

Application filed June 14, 1924. Serial No. 720,002.

This invention relates to bearings and more particularly to bearings for shafts having only limited angular movement. The invention seeks to provide a bearing which shall eliminate friction between the shaft and bearing and the wear consequent thereto as well as the necessity for the use of a lubricant therebetween. The invention also seeks to provide a bearing which shall be noiseless during relative motion between the bearing and the shaft and in which shocks and stresses set up in either of the co-operating parts shall be cushioned or absorbed and not transmitted in undiminished intensity from one element to the other. Further the invention seeks to obviate the necessity for return springs in situations where it is desirable to return the relatively movable parts to normal position upon the release of one such part. Accordingly a bearing support or housing is provided into which a shaft extends and yielding non-metallic material is disposed between the shaft and the bearing support. More specifically seats are formed in the bearing support and co-operating seats are formed on the shaft and blocks of non-metallic yielding material are retained between the seats. It is preferred to retain the blocks of yielding non-metallic material under compression between the seats whereby the strength, resiliency and wearing qualities of the material are increased. To facilitate assembly an aperture may be formed in the bearing support in register with the seat formed therein and a closure therefor suitably secured to the bearing support may serve as a portion of the seat for the purpose specified. The invention will be found particularly useful in many situations about a motor vehicle, for instance, wherein it is desired to eliminate bearings requiring lubrication. It will be obvious that no machining is required for the co-operating relatively moving parts and consequently an appreciable saving in time and labor may result. The invention will be found particularly efficacious as a connection between an arm or a shaft, as for instance, a clutch or brake pedal or any other lever having small angular motion. The use of yielding non-metallic blocks of the character described will be found particularly advantageous in situations where a return spring is ordinarily provided to return the parts to normal position, the yielding non-metallic material serving to return the parts to predetermined position upon release of one of the elements.

In order that the invention may be clearly understood and readily carried into effect the same will now be described more fully with reference to the accompanying drawings illustrating a preferred embodiment thereof and in which:

Figure 1 is a view partly in section showing the invention as applied to the connection between a clutch or brake pedal and the operating shaft in a motor vehicle.

Figure 2 is a fragmentary view, partly in section, looking at the connection between the pedal and shaft from the right in Figure 1.

The arm $a$ which in the illustrated embodiment is shown as a clutch pedal carries at its upper end a tread $a'$ for the foot of the operator and at its opposite end is formed with a cylindrical housing or bearing support $a^2$, a suitable connecting rod being indicated at $a^3$ whereby motion of the pedal is transmitted to remote actuating mechanism. There is shown as entering the housing $a^2$ a shaft $b$ which in the illustrated embodiment serves as a stationary support or axis about which the lever arm $a$ turns through a predetermined angle, the shaft being illustrated as formed upon a bracket $b'$ adapted to be secured in any convenient manner upon the vehicle chassis. Bracket $b'$ also serves to close one side of the cylindrical housing $a^2$ as is clearly apparent from Figure 2 of the drawings. Upon the opposite side of housing $a^2$ there is illustrated a closure $b^2$ rigidly secured to the shaft $b$ as by the screw $b^3$.

In order to provide a bearing between the lever arm $a$ and the shaft $b$ it is proposed according to the present invention to dispose yielding non-metallic material therebetween which, in the illustrated embodiment, takes the form of blocks $c$ of yielding non-metallic material retained between seats $a^4$ and co-operating seats $b^4$ formed on the shaft $b$. It will be apparent upon an inspection of Figure 1 that the respective metallic surfaces of the housing and shaft do not contact at any time but are always retained in spaced supporting relation through the blocks of yielding non-metallic material. Such a construction obviates the necessity of machining the surface of the shaft $b$ or the interior of the bearing support $a^2$ as will be readily appreciated. While three blocks of yielding non-metallic material have been illustrated as forming the bearing medium between the shaft and arm it will be obvious that any number of such blocks may be used and that their number will depend upon the size of the co-operating elements and the purpose for which they are intended. Preferably the blocks $c$ are formed of rubber and are retained between the seats under internal static pressure since such condition increases considerably the resiliency and wearing qualities of rubber. To facilitate the assembly of the device an aperture $a^5$ may be formed in the housing $a^2$ in register with one of the seats $a^4$, bolts $d$ serving to secure a closure $d'$ over the opening $a^5$ as a bottom for the seat. While only one such closure has been illustrated in the drawings it will be apparent that should circumstances require it each of the seats may be similarly provided with an opening and closure therefor.

It will thus be seen that a fulcrum has been provided for an arm or lever which avoids a metal to metal contact thus doing away with the necessity of lubrication and at the same time insuring a noiseless joint, while the resiliency of the blocks of yielding non-metallic material retained between the seats will insure that the lever is returned to normal position upon release of pressure upon the tread $a'$ through the return of the blocks to normal position from distortion.

It will be apparent to one skilled in the art that the application of the bearing hereinbefore described is not limited to the fulcrum of an arm or lever but is equally applicable in any situation in which an arm is adapted to be connected to a shaft with provision for limited movement or play therebetween and that in all such applications of the invention a construction is provided which obviates the necessity of machining the parts, does away with all need of lubrication and affords a connection in which the shocks or stresses impressed upon either the arm or the shaft is cushioned or absorbed and prevented from being transmitted in undiminished intensity. Reversal of parts as well as various applications of the invention will occur to those skilled in the art and modifications of the structure disclosed herein will naturally follow and no limitation is intended except as indicated in the appended claims.

What I claim is:

1. In combination, a shaft, a bearing support, a recessed seat comprising a socket shaped portion formed on the shaft, a co-operating seat formed in the bearing support, an aperture formed in the circumferential wall of the bearing support in register with the seat, a closure for the aperture forming part of said last named seat, and a block of yielding non-metallic material retained between the seats under compression.

2. In combination, an arm formed with a housing, a shaft entering the housing, seats formed on the interior of the housing, recessed seats formed on the shaft and comprising socket-shaped portions thereon, said recessed seats co-operating respectively with the seats on the housing, and blocks of yielding non-metallic material retained between the co-operating seats under compression.

3. In combination, a shaft, a bearing support, said shaft and bearing support being relatively movable, a plurality of spaced blocks of yielding non-metallic material disposed radially about the shaft within the bearing support and means to secure said blocks to the shaft and bearing support, respectively, under compression.

4. In combination, an arm formed with a housing, a shaft entering the housing, a plurality of seats formed in the housing, a plurality of seats formed on the shaft co-operating with the first named seats, an aperture formed in the housing in register with one of the first named seats, a closure for the aperture forming part of said last named seat, and blocks of yielding non-metallic material retained between the respective co-operating seats.

5. In combination, an arm formed with a housing, a shaft entering the housing, a plurality of seats formed in the housing, a plurality of seats formed on the shaft co-operating with the first named seats, blocks of yielding non-metallic material retained between the respective co-operating seats, an aperture formed in the housing in register with one of the first named seats and forming a part thereof, a closure for the aperture forming part of said last named seat, and means to secure the closure thereover, whereby the blocks of yielding material will be placed under compression.

6. In combination, a shaft, a bearing support, said shaft and bearing support being relatively movable, a plurality of spaced blocks of yielding non-metallic material disposed radially about the shaft within the bearing support, means to secure the blocks to the shaft and bearing support, respectively, under compression and adjustable means on the shaft to prevent axial movement of the bearing support with respect thereto.

This specification signed this 5th day of June, A. D. 1924.

CHARLES FROESCH.